(No Model.)
J. C. & S. CHAMBERS.
WELL DIGGING MACHINE.
No. 271,600. Patented Feb. 6, 1883.
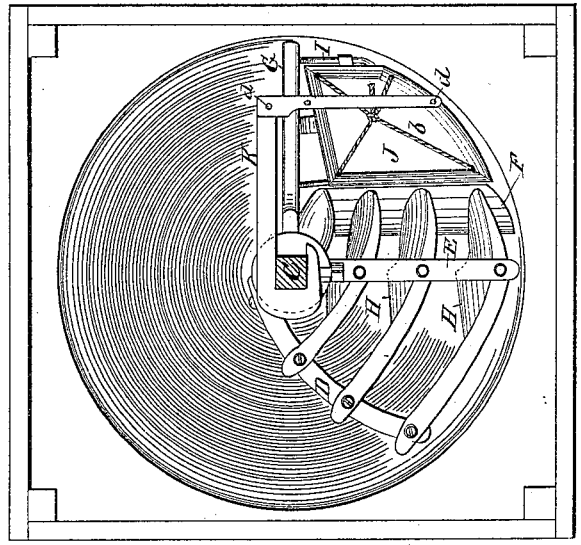
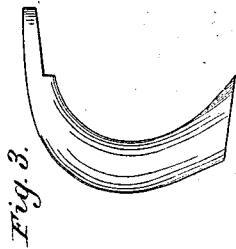
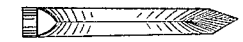
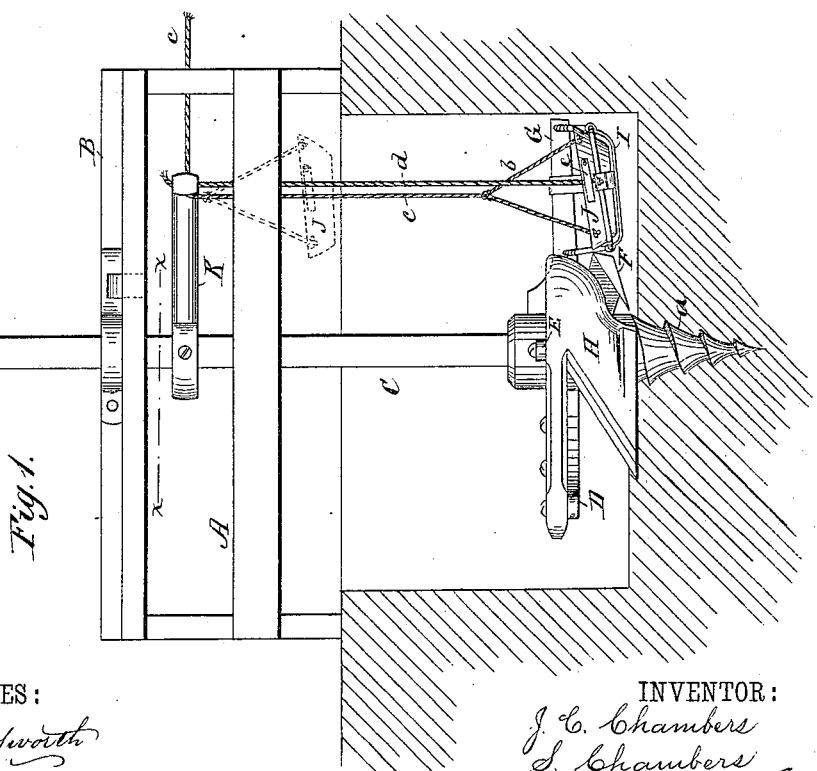
WITNESSES:
W. W. Hollingsworth
Edw. W. Byrn
INVENTOR:
J. C. Chambers
S. Chambers
BY
ATTORNEYS.
N. PETERS, Photo-Lithographer, Washington, D. C.

UNITED STATES PATENT OFFICE.

JOB C. CHAMBERS AND SILAS CHAMBERS, OF DALLAS, TEXAS.

WELL-DIGGING MACHINE.

SPECIFICATION forming part of Letters Patent No. 271,600, dated February 6, 1883.

Application filed May 22, 1882. (No model.)

*To all whom it may concern:*

Be it known that we, JOB C. CHAMBERS and SILAS CHAMBERS, of Dallas, in the county of Dallas and State of Texas, have invented a new and Improved Well-Digging Machine; and we do hereby declare that the following is a full, clear, and exact description of the same, reference being had to the accompanying drawings, forming part of this specification, in which—

Figure 1 is a side view of the device, shown in process of digging a well. Fig. 2 is a plan view of the same, with the boring-shaft in section through the line $xx$; and Fig. 3 shows side and front views of a modified form of plow or cutter for use in cutting rock, &c.

Our invention relates to an improved construction of machine for digging wells, cisterns, and other circular holes in the ground. It is an improvement upon that form of well-digger in which a vertical shaft is provided at its lower end with a spirally-flanged point or worm to draw it into the earth, and upon each side has detachable scoops, which are filled by the act of turning, and when filled are raised to the surface by block and tackle and dumped.

Our improvement consists in connecting to the bottom of said shaft a gang of plows, which effectually break and cut up the earth, and combining therewith a fixed and inclined shear-blade and detachable earth-receiver, the said shear-blade being located in the rear of the plows, for raising the earth from the motion of the plow, and delivering it automatically into the detachable earth-receiver, which is raised to the surface with its load by means of ropes and pulleys, as hereinafter more fully described.

In the drawings, A represents a frame-work having at the top a cross-bar, B, forming an upper guide for the vertical boring or centering shaft C, which latter is provided at its lower end with a spirally-flanged point or worm, $a$, that enters the ground and serves to draw the shaft down into the ground when rotated. To the lower portion of the shaft, near the worm $a$, are rigidly fastened the horizontally-projecting arms D E F G. To the arms D and E are securely fastened a series of plows, H, the inner plow next to the shaft being slightly in advance of the others. The arms F and G are arranged immediately in rear of the plows, and between them is supported a cage or holder, I, for the dirt-tray J. The arm F, which supports the front edge of the tray-holder, is made in the nature of a blade, (see Fig. 1,) with its front edge inclined downwardly just in rear of the plows, and it serves as a shear to take the dirt as it is broken up by the plows and direct it up into the tray J, the top edge of the tray being, when seated in the cage or holder, on a level with the top rear edge of the blade or arm F. Detachably fixed upon the shaft C is a projecting arm, K, which serves as a support for hoisting the dirt-tray out of the well when it becomes filled with dirt. To the tray is fastened a sling, $b$, to which is attached a rope, $c$, that passes through a pulley or sheave block, which is attached to the arm, by pulling upon which rope the tray may be raised. To prevent the tray from turning round and twisting the rope while raising or lowering it, two guide-ropes, $d\,d$, are fastened to the arm K, and extend to the tray-cage below on each side of the tray, and the tray is guided upon these ropes by means of cleats or guides $e\,e$.

In making use of the machine as thus described, the worm of the shaft is placed upon the ground, and the shaft, then being guided by the upper cross-bar, is rotated by means of the adjustable sweep L, which, as fast as the shaft descends, is from time to time adjusted higher up on the shaft. As the worm enters the ground to hold the shaft in central position the plows describe concentric circles about the worm, thoroughly breaking and cutting up the earth, and the blade F scoops this earth into the tray, which, as often as it is filled, is raised by means of its hoisting-tackle and dumped outside of the well. As the plows gradually descend into the well the supporting-arm K for raising the tray is from time to time adjusted higher on the shaft, just as is the sweep L. If hard strata of earth or rock are reached, the mold-board plows are removed and another form of plow (shown in Fig. 3) is substituted, which has a sharp narrow drill-edge. These plows then cut concentric grooves in the rock or hard earth, and when the grooves are of sufficient depth the vertical concentric rings or walls of rock which are left are broken down and removed.

In defining our invention more clearly we would state that we are aware of the Patents No. 202,417 and No. 4,531, and do not claim anything shown therein.

Having thus described our invention, what we claim as new is—

1. The combination, with a vertical boring or centering shaft, of a set of plows rigidly fixed to the lower end of said shaft, a fixed and inclined shear-blade located in the rear of said plows, and a detachable tray located in rear of the said shear-blade, as and for the purpose described.

2. The combination, with the shaft C, of a set of plows fixed rigidly to the lower end, the inclined blade F and arm G, the cage I, supported by the latter, and the vertically-movable tray J, as and for the purpose described.

3. The combination of the shaft C with worm $a$ and sweep L, the rigid arms D E F G, the plows H, the cage I, tray J, and supporting-arm K, as and for the purpose described.

JOB C. CHAMBERS.
SILAS CHAMBERS.

Witnesses:
D. W. McKEE,
J. G. STEVENS.